(12) United States Patent
Seong et al.

(10) Patent No.: US 12,305,018 B2
(45) Date of Patent: May 20, 2025

(54) MXENE-POLYMER COMPOSITE COMPRISING MXENE AND UV CURABLE POLYMER, AND SENSOR COMPRISING THE SAME

(71) Applicant: KOREA INSTITUTE OF SCIENCE AND TECHNOLOGY, Seoul (KR)

(72) Inventors: Hyejeong Seong, Seoul (KR); Seon Joon Kim, Seoul (KR); Nakwon Choi, Seoul (KR); Mina Kim, Seoul (KR); Eun Yeong Yang, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 18/450,940

(22) Filed: Aug. 16, 2023

(65) Prior Publication Data

US 2024/0124679 A1 Apr. 18, 2024

(30) Foreign Application Priority Data

Oct. 12, 2022 (KR) ........................ 10-2022-0130873

(51) Int. Cl.
| | |
|---|---|
| *H01B 1/20* | (2006.01) |
| *C08K 3/08* | (2006.01) |
| *C08K 3/14* | (2006.01) |
| *C08L 33/08* | (2006.01) |
| *H01G 11/36* | (2013.01) |

(52) U.S. Cl.
CPC ................. *C08K 3/14* (2013.01); *C08K 3/08* (2013.01); *C08L 33/08* (2013.01); *H01B 1/20* (2013.01); *H01G 11/36* (2013.01); *C08K 2201/001* (2013.01); *C08K 2201/011* (2013.01); *C08L 2203/20* (2013.01)

(58) Field of Classification Search
CPC ... H01B 1/06; H01B 1/20; H01B 1/22; C08K 3/08; C08K 3/14; H01G 11/36
See application file for complete search history.

(56) References Cited

U.S. PATENT DOCUMENTS

| | | |
|---|---|---|
| 2019/0391099 A1 | 12/2019 | Jung et al. |
| 2021/0102900 A1 | 4/2021 | Wang et al. |

FOREIGN PATENT DOCUMENTS

| | | | |
|---|---|---|---|
| CN | 107099054 A | | 8/2017 |
| CN | 110862556 A | * | 3/2020 |
| CN | 111141427 A | | 5/2020 |
| CN | 111171703 A | | 5/2020 |

(Continued)

OTHER PUBLICATIONS

Zhang et al "MXene hydrogels: fundamentals and applications", Chem. Soc. Rev., 2020, 49, 7229.*

(Continued)

*Primary Examiner* — Mark Kopec

(57) ABSTRACT

The disclosure relates to a MXene-polymer composite comprising MXene and a UV curable polymer, and a sensor comprising the same. Particularly, the MXene-polymer composite according to the disclosure polymerizes the MXene with the UV-curable polymer to stably disperse the MXene in a porous hydrogel matrix, thereby exhibiting a larger surface area and enabling local patterning, and when the MXene-polymer composite is applied as a sensor, excellent electrochemical sensitivity and gas reactivity can be obtained.

18 Claims, 5 Drawing Sheets

(56) References Cited

FOREIGN PATENT DOCUMENTS

| CN | 112210088 A | * | 1/2021 |
| CN | 112876585 A | * | 6/2021 |
| CN | 113045716 A |   | 6/2021 |
| CN | 115096953 A |   | 9/2022 |
| JP | 2020-522678 A |   | 7/2020 |
| KR | 10-2019-0076341 A |   | 7/2019 |
| KR | 10-2021-0067670 A |   | 6/2021 |

OTHER PUBLICATIONS

Ge et al "Ti3C2Tx MXene-Activated Fast Gelation of Stretchable and Self-Healing Hydrogels: A Molecular Approach", ACS Nano 2021, 15, 2698-2706.*

Highly Conducting MXene-Silver Nanowire Transparent Electrodes for Flexible Organic Solar Cells, ACS Appl. Mater. Interfaces 2019, 11, 25330-25337.*

Md Salauddin et al., "A Novel MXene/Ecoflex Nanocomposite-Coated Fabric as a Highly Negative and Stable Friction Layer for High-Output Triboelectric Nanogenerators" Advanced Energy Materials, 2021, vol. 11, No. 2002832.

* cited by examiner

Ti$_3$C$_2$T$_x$ MXene gas sensor

MXene thin film

+ Slow diffusion

MXene composite

+ Fast diffusion

MXENE-POLYMER COMPOSITE COMPRISING MXENE AND UV CURABLE POLYMER, AND SENSOR COMPRISING THE SAME

CROSS REFERENCE TO RELATED APPLICATION

The present application claims priority to Korean Patent Application No. 10-2022-0130873, filed Oct. 12, 2022, the entire contents of which is incorporated herein for all purposes by this reference.

BACKGROUND

Field

The disclosure relates to a MXene-polymer composite comprising MXene and a UV curable polymer, and a sensor comprising the same.

DESCRIPTION OF GOVERNMENT-SPONSORED RESEARCH

This research was conducted with the support of Operation cost support project of Korea Institute of Science and Technology (Brain Mega Project in preparation for an aging society, task identification number: 1711173277) of Ministry of Science and ICT, Next-generation intelligent semiconductor technology development project of Korea Institute of Science and Technology (development of a large-area cranial nerve measurement platform integrated with ultra-thin organic active devices and 3-dimensional electrodes, task identification number: 1711157544) of Ministry of Science and ICT, and Personal basic research project (development of two-dimensional MXene nanocomposite-based platform-type chemical sensor material, task identification number: 1711164354) of Ministry of Science and ICT, under the supervision of the Korea Institute of Science and Technology.

Background Art

MXene materials, which are transition metal carbides, transition metal nitrides, or transition metal carbonitrides, are a nanomaterial having a two-dimensional crystal structure, and have excellent properties, such as electrical conductivity, surface property controllability and solution processability, and thus its applicability to various industrial fields, including flexible electrodes, conductive cohesive/adhesive materials, electromagnetic wave-shielding materials, flexible heaters, sensors, energy storage electrodes, and the like, has been spotlighted.

In general, such MXenes having high electrical conductivity may be synthesized from a ceramic material called MAX. Particularly, MAX is a ternary layered-structure compound of a transition metal (titanium (Ti), niobium (Nb), vanadium (V), tantalum (Ta), molybdenum (Mo) or chromium (Cr)) represented by M, a Group 14 element (aluminum (Al), silicon (Si), or the like) represented by A, and carbon or nitrogen represented by X. Also, MXenes are obtained by selectively removing a Group 14 element, such as aluminum, through an etching process using a strong acid, such as hydrofluoric acid (HF), from MAX to provide two-dimensional MXenes in which merely the transition metal and carbon (or nitrogen) remain. The surface of MXenes has terminal groups, such as —OH, =O, —F and —Cl, due to the synthetic path using a strong acid in an aqueous phase. Particularly, the MXenes have hydrophilicity through the —OH functional group of the terminal groups. The MXenes synthesized in this way have excellent water dispersibility and this two-dimensional MXene materials are easy to use as a sensor through the adsorption of reactants due to the nature of their surfaces.

To this end, a technology of converting the MXene material into a film and attaching it to an electrode material is required, and such existing technologies include spin coating and lamination using filtration. However, when a MXene thin film is manufactured using these existing technologies and used as a sensor, the reactivity is limited due to the limited surface area, and it is difficult to perform local patterning on an electrode part.

DOCUMENTS OF RELATED ART

Summary

An object of the disclosure is to provide a MXene-polymer composite in which MXene is polymerized with a UV-curable polymer and stably dispersed in a porous hydrogel matrix, resulting in a larger surface area and excellent sensitivity when applied as a sensor.

In order to achieve the above object, an embodiment of the disclosure is to provide a MXene-polymer composite comprising MXene and UV curable polymer, In addition, an embodiment of the disclosure provides a sensor comprising the MXene-polymer composite and an electrode coated with the composite.

The MXene-polymer composite according to the disclosure polymerizes the MXene with the UV-curable polymer to stably disperse the MXene in a porous hydrogel matrix, thereby exhibiting a larger surface area and enabling local patterning, and when the MXene-polymer composite is applied as a sensor, excellent electrochemical sensitivity and gas reactivity can be obtained.

DETAILED DESCRIPTION

Figure 1:
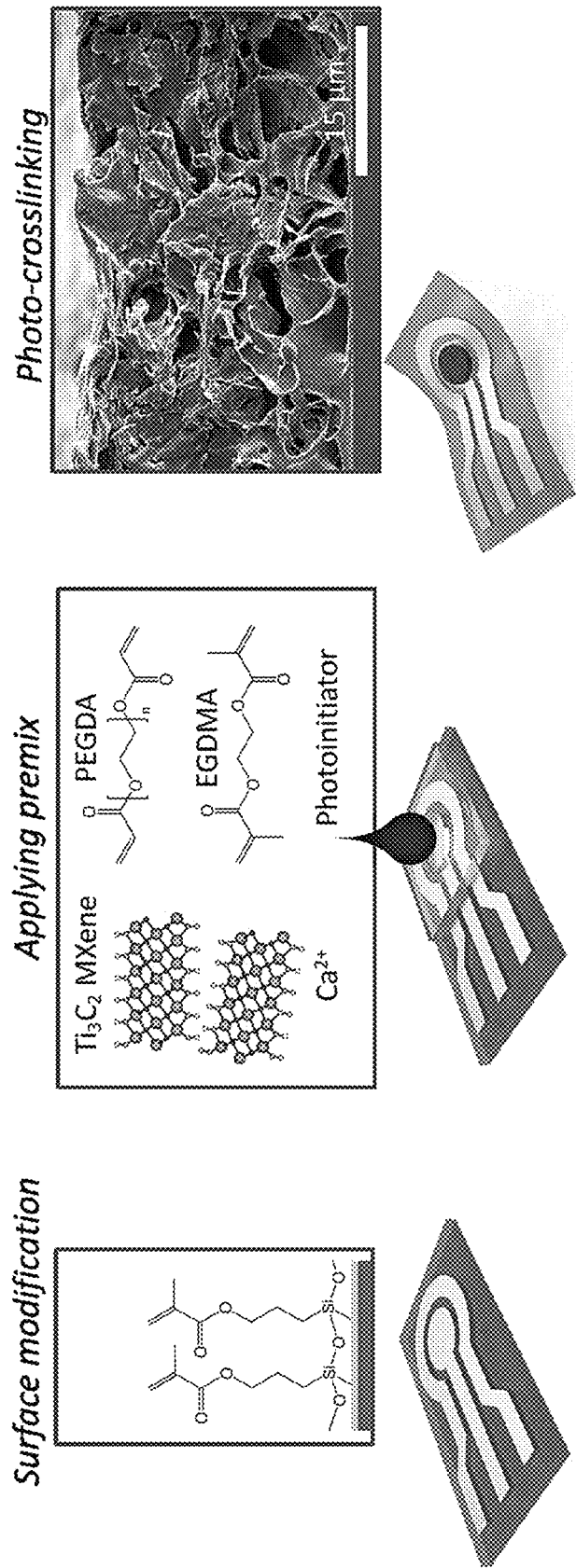
FIG. 1 is a diagram schematically illustrating a process of applying a MXene-polymer composite to an electrode according to an embodiment of the disclosure.

Hereinafter, the disclosure will be described in detail.

In one aspect, the disclosure may relate to a MXene-polymer composite comprising MXene and a UV curable polymer.

In an embodiment, the composite may be in the form of a hydrogel.

In an embodiment, the composite may have a porous structure.

In an embodiment, the pore size of the composite may be 1 to 10 μm. Particularly, the pore size of the composite may be 1 μm or more, 2 μm or more, 3 μm or more, 4 μm or more, 5 μm or more, 6 μm or more, 7 μm or more, 8 μm or more, or 9 μm or more, or the pore size of the composite may be 10 μm or less, 9 μm or less, 8 μm or less, 7 μm or less, 6 μm or less, 5 μm or less, 4 μm or less, 3 μm or less, or 2 μm or less.

In an embodiment, the MXene may include at least one layer with a two-dimensional array of crystal cells represented by the empirical formula of $M_{n+1}X_n$.

Herein, each X is positioned in an octahedral array formed of a plurality of M elements, M is at least one metal selected from the group consisting of Group IIIB metals, Group IVB metals, Group VB metals, and Group VIB metals, each X represents C, N, or a combination thereof, and n may be 1, 2, or 3.

According to an embodiment, M may include, for example, Sc, Y, Lu, Ti, Zr, Hf, V, Nb, Ta, Cr, Mo, W, or a combination thereof, but are not limited thereto. In addition, examples of the empirical formula of $M_{n+1}X_n$ may include $Sc_2C$, $Ti_2C$, $Ti_3C_2$, $Nb_2C$, $V_2C$, $Ta_4C_3$, $Mo_2TiC_2$, $Mo_2Ti_2C_3$, $Cr_2TiC_2$, $Ti_2N$, $Ti_3CN$, $Mo_2C$, $Nb_4C_3$, $Zr_3C_2$, $Ti_4N_3$, $V_4C_3$, $Hf_3C_2$, $Mo_2N$, $Cr_2C$, $Zr_2C$, $Nb_2C$, $Hf_2C$, $V_3C_2$, $Ta_3C_2$, or $Ti_4C_3$, but are not limited thereto.

In an embodiment, the MXene may be $Ti_3C_2$ MXene.

According to an embodiment, the MXene may include at least one layer with a two-dimensional array of crystal cells represented by the empirical formula of $M'_2M''_nX_{n+1}$.

Herein, each X is positioned in an octahedral array formed of a plurality of M' and M'' elements, M' and M'' are different metals selected from the group consisting of Group IIIB metals, Group IVB metals, Group VB metals, and Group VIB metals, each X represents C, N, or a combination thereof, and n may be 1 or 2.

According to an embodiment, M may include, for example, Ti, V, Nb, Ta, Cr, Mo, or a combination thereof, but are not limited thereto. In addition, examples of the empirical formula of $M'_2M''_nX_{n+1}$ may include $Mo_2VC_2$, $Mo_2TaC_2$, $Mo_2NbC_2$, $Cr_2VC_2$, $Cr_2TaC_2$, $Cr_2NbC_2$, $Ti_2TaC_2$, $Ti_2NbC_2$, $V_2TaC_2$, $V_2TiC_2$, $Mo_2V_2C_3$, $Mo_2Nb_2C_3$, $Mo_2Ta_2C_3$, $Cr_2Ti_2C_3$, $Cr_2Ta_2C_3$, $Cr_2V_2C_3$, $Cr_2Nb_2C_3$, $Nb_2Ta_2C_3$, $Ti_2Nb_2C_3$, $Ti_2Ta_2C_3$, $V_2Nb_2C_3$, $V_2Ta_2C_3$, or $V_2Ti_2C_3$, but are not limited thereto.

In an embodiment, the UV curable polymer may be at least one selected from the group consisting of polyethylene glycol diacrylate(PEGDA), ethylene glycol dimethacrylate (EGDMA), polyethylene glycol dimethacrylate (PEGDMA), polyurethane acrylate (PUA), and SU-8 epoxy-based resin.

In an embodiment, the PEGDA and the PEGDMA may each independently have a number average molecular weight (Mn) of 200 to 6,000. Particularly, the PEGDA and the PEGDMA may each independently have a number average molecular weight (Mn) of 200 or more, 300 or more, 400 or more, 500 or more, 600 or more, 700 or more, 800 or more, 900 or more, 1,000 or more, 1,500 or more, 2,000 or more, 2,500 or more, 3,000 or more, 3,500 or more, 4,000 or more, 4,500 or more, 5,000 or more, or 5,500 or more. Alternatively, the PEGDA and the PEGDMA may each independently have a number average molecular weight (Mn) of 6,000 or less, 5,500 or less, 5,000 or less, 4,500 or less, 4,000 or less, 3,500 or less, 3,000 or less, 2,500 or less, 2,000 or less, 1,500 or less, 1,000 or less, 900 or less, 800 or less, 700 or less, 600 or less, 500 or less, 400 or less, or 300 or less.

In an embodiment, the MXene may be comprised in an amount of 5 to 90% (v/v) based on the total volume of the composite. Particularly, the MXene may be comprised in an amount of 5% (v/v) or more, 10% (v/v) or more, 11% (v/v) or more, 12% (v/v) or more, 13% (v/v) or more, 14% (v/v) or more, 15% (v/v) or more, 16% (v/v) or more, 17% (v/v) or more, 18% (v/v) or more, 19% (v/v) or more, 20% (v/v) or more, 21% (v/v) or more, 22% (v/v) or more, 23% (v/v) or more, 24% (v/v) or more, 25% (v/v) or more, 26% (v/v) or more, 27% (v/v) or more, 28% (v/v) or more, 29% (v/v) or more, 30% (v/v) or more, 31% (v/v) or more, 32% (v/v) or more, 33% (v/v) or more, 34% (v/v) or more, 35% (v/v) or more, 36% (v/v) or more, 37% (v/v) or more, 38% (v/v) or more, 39% (v/v) or more, 40% (v/v) or more, 41% (v/v) or more, 42% (v/v) or more, 43% (v/v) or more, 44% (v/v) or more, 45% (v/v) or more, 46% (v/v) or more, 47% (v/v) or more, 48% (v/v) or more, 49% (v/v) or more, 50% (v/v) or more, 55% (v/v) or more, 60% (v/v) or more, 65% (v/v) or more, 70% (v/v) or more, 75% (v/v) or more, 80% (v/v) or more, or 85% (v/v) or more, based on the total volume of the composite. Alternatively, the MXene may be comprised in an amount of 90% (v/v) or less, 85% (v/v) or less, 80% (v/v) or less, 75% (v/v) or less, 70% (v/v) or less, 65% (v/v) or less, 60% (v/v) or less, 59% (v/v) or less, 58% (v/v) or less, 57% (v/v) or less, 56% (v/v) or less, 55% (v/v) or less, 54% (v/v) or less, 53% (v/v) or less, 52% (v/v) or less, 51% (v/v) or less, 50% (v/v) or less, 49% (v/v) or less, 48% (v/v) or less, 47% (v/v) or less, 46% (v/v) or less, 45% (v/v) or less, 44% (v/v) or less, 43% (v/v) or less, 42% (v/v) or less, 41% (v/v) or less, 40% (v/v) or less, 39% (v/v) or less, 38% (v/v) or less, 37% (v/v) or less, 36% (v/v) or less, 35% (v/v) or less, 34% (v/v) or less, 33% (v/v) or less, 32% (v/v) or less, 31% (v/v) or less, 30% (v/v) or less, 29% (v/v) or less, 28% (v/v) or less, 27% (v/v) or less, 26% (v/v) or less, 25% (v/v) or less, 24% (v/v) or less, 23% (v/v) or less, 22% (v/v) or less, 21% (v/v) or less, 20% (v/v) or less, 19% (v/v) or less, 18% (v/v) or less, 17% (v/v) or less, 16% (v/v) or less, 15% (v/v) or less, 14% (v/v) or less, 13% (v/v) or less, 12% (v/v) or less, 11% (v/v) or less, or 10% (v/v) or less, based on the total volume of the composite.

In an embodiment, the UV curable polymer may be comprised in an amount of 5 to 90% (v/v) based on the total volume of the composite. Particularly, the UV curable polymer may be comprised in an amount of 5% (v/v) or more, 10% (v/v) or more, 11% (v/v) or more, 12% (v/v) or more, 13% (v/v) or more, 14% (v/v) or more, 15% (v/v) or more, 16% (v/v) or more, 17% (v/v) or more, 18% (v/v) or more, 19% (v/v) or more, 20% (v/v) or more, 21% (v/v) or more, 22% (v/v) or more, 23% (v/v) or more, 24% (v/v) or more, 25% (v/v) or more, 26% (v/v) or more, 27% (v/v) or more, 28% (v/v) or more, 29% (v/v) or more, 30% (v/v) or more, 31% (v/v) or more, 32% (v/v) or more, 33% (v/v) or more, 34% (v/v) or more, 35% (v/v) or more, 36% (v/v) or more, 37% (v/v) or more, 38% (v/v) or more, 39% (v/v) or more, 40% (v/v) or more, 45% (v/v) or more, 50% (v/v) or more, 55% (v/v) or more, 60% (v/v) or more, 65% (v/v) or more, 70% (v/v) or more, 75% (v/v) or more, 80% (v/v) or more, or 85% (v/v) or more based on the total volume of the composite. Alternatively, the UV curable polymer may be comprised in an amount of 90% (v/v) or less, 85% (v/v) or less, 80% (v/v) or less, 75% (v/v) or less, 70% (v/v) or less, 65% (v/v) or less, 60% (v/v) or less, 55% (v/v) or less, 50% (v/v) or less, 49% (v/v) or less, 48% (v/v) or less, 47% (v/v) or less, 46% (v/v) or less, 45% (v/v) or less, 44% (v/v) or less, 43% (v/v) or less, 42% (v/v) or less, 41% (v/v) or less, 40% (v/v) or less, 39% (v/v) or less, 38% (v/v) or less, 37% (v/v) or less, 36% (v/v) or less, 35% (v/v) or less, 34% (v/v) or less, 33% (v/v) or less, 32% (v/v) or less, 31% (v/v) or less, 30% (v/v) or less, 29% (v/v) or less, 28% (v/v) or less, 27% (v/v) or less, 26% (v/v) or less, 25% (v/v) or less, 24% (v/v) or less, 23% (v/v) or less, 22% (v/v) or less, 21% (v/v) or less, 20% (v/v) or less, 19% (v/v) or less, 18% (v/v) or less, 17% (v/v) or less, 16% (v/v) or less, 15% (v/v) or less, 14% (v/v) or less, 13% (v/v) or less, 12% (v/v) or less, 11% (v/v) or less, or 10% (v/v) or less based on the total volume of the composite.

In an embodiment, the composite may further comprise a radical initiator and a cation.

In an embodiment, the cation may be potassium ion, calcium ion or sodium ion.

In an embodiment, the radical initiator may be a free radical photoinitiator. However, the radical initiator is not limited to photoinitiator, and any initiator capable of providing radicals to enable free radical-based synthesis may be used as the radical initiator. Particularly, the free radical photoinitiator may be selected from those commonly used to induce formation of polymer radicals necessary for a photocrosslinking reaction by releasing hydrogen from a main chain of a polymer or the like in a photoexcited state.

In an embodiment, the free radical photoinitiator may be one or more selected from a benzophenone-based photoinitiator and a thiaxantone-based photoinitiator. More particularly, the benzophenone-based photoinitiator may include, for example, benzophenone, o-benzoylbenzoate methyl-4-phenylbenzophenone, 4,4'-dichlorobenzophenone, hydroxybenzophenone, 4-benzoyl-4'-methyl-diphenylsulfide, acrylated benzophenone, 3,3',4,4'-tetra(t-butylperoxycarbonyl)benzophenone, 3,3'-dimethyl-4-methoxybenzophenone, 2,4,6-trimethylbenzophenone, and 4-methylbenzophenone, but is not limited thereto. In addition, the thiazanthone-based photoinitiator may include, for example, 2-isopropylthioxanthone, 2,4-dimethylthioxanthone, 2,4-diethylthioxanthone, and 2,4-dichlorothioxanthone, but is limited thereto.

In an embodiment, the radical initiator and the cation may be comprised in an amount of 5 to 20% (v/v) based on the total volume of the composite. Particularly, the radical initiator and the cation may be comprised in an amount of 5% (v/v) or more, 6% (v/v) or more, 7% (v/v) or more, 8% (v/v) or more, 9% (v/v) or more, 10% (v/v) or more, 11% (v/v) or more, 12% (v/v) or more, 13% (v/v) or more, 14% (v/v) or more, 15% (v/v) or more, 16% (v/v) or more, 17% (v/v) or more, 18% (v/v) or more, or 19% (v/v) or more, based on the total volume of the composite. Alternatively, the radical initiator and the cation may be comprised in an amount of 20% (v/v) or less, 19% (v/v) or less, 18% (v/v) or less, 17% (v/v) or less, 16% (v/v) or less, 15% (v/v) or less, 14% (v/v) or less, 13% (v/v) or less, 12% (v/v) or less, 11% (v/v) or less, 10% (v/v) or less, 9% (v/v) or less, 8% (v/v) or less, 7% (v/v) or less, or 6% (v/v) or less, based on the total volume of the composite.

In another aspect, the disclosure may relate to a sensor comprising the MXene-polymer composite and an electrode coated with the composite.

As illustrated in FIG. 1, a sensor according to an embodiment of the disclosure may be manufactured by applying the MXene-polymer composite to an electrode with a pre-treated surface. More specifically, the senor may be prepared by applying a mixture of the MXene, the UV curable polymer, the free radical photoinitiator, and the cation to a metal thin film electrode with a pre-treated surface and photocuring the mixture.

In an embodiment, the electrode may be formed in the form of a thin film using any one of aluminum (Al), nickel (Ni), platinum (Pt), titanium (Ti), chromium (Cr), and gold (Au), but is not limited thereto. All materials used for general metal electrodes may be used as the electrode.

In an embodiment, the surface of the electrode may be pre-treated.

In an embodiment, the pre-treatment may be selected from a self-assembled monolayer method, a polymer coating method, and a plasma ion treatment method using oxygen gas.

In an embodiment, the sensor may be an electrochemical sensor.

In an embodiment, the sensor may be an electrochemical sensor for detecting dopamine.

In an embodiment, the sensor may be a gas sensor.

In an embodiment, the sensor may be a gas sensor for detecting ammonia.

Hereinafter, the disclosure will be explained in more detail with reference to examples and test examples. However, the following examples and test examples are for illustrative purposes only, and the scope of the disclosure should not be construed as limited to the exemplary embodiments set forth therein. In addition, various modifications, substitutions and insertions generally known to those skilled in the art may be made to the disclosure, and such modifications, substitutions and insertions also fall within the scope of the disclosure.

[Preparation Example] Preparation of $Ti_3C_2$ MXene Aqueous Solution

LiF (99.995%, Sigma-Aldrich Co. LLC) was added to an HCl aqueous solution (36 wt % in water, Junsei Chemical Co., Ltd) and stirred to prepare a LiF/HCl mixed solution. 1 g of $Ti_3AlC_2$ having a MAX phase was slowly added to the LiF/HCl mixed solution for 10 minutes, followed by reaction at a constant temperature of 35° C. for 24 hours to selectively etch the Al layer from $Ti_3AlC_2$. The obtained reactant was washed by centrifuging 5 times for 5 minutes at 3500 rpm with an excess of deionized water. Thereafter, an excess amount of deionized water was added to the settled debris, shaken by hand for 10 minutes, and the resulting MXene dispersion was again centrifuged at 3500 rpm for 1 hour, and the resulting supernatant was taken to obtain an aqueous $Ti_3C_2Tx$ solution. In this case, the concentration of the MXene aqueous solution was 11 mg/ml.

[Example 1] Manufacture of a MXene-Polymer Composite

65% (v/v) of the $Ti_3C_2$ MXene aqueous solution prepared in Preparation Example above, 30% (v/v) of PEGDA (95 to 100%) (Mn 2000) solution, and 5% (v/v) of EGDMA were mixed to prepare a mixture, and then, Irgacure 1173 and calcium ions ($Ca^{2+}$), which corresponded to 5% (v/v) of the mixture, were additionally added to the mixture as a photoinitiator and a crosslinking aid. The mixture was exposed to a UV lamp having a wavelength of 365 nm at room temperature for 10 minutes to undergo a photocuring reaction to manufacture the MXene-polymer composite according to an embodiment of the disclosure.

[Example 2] Manufacture of a Sensor Using the MXene-Polymer Composite

A mixture of $Ti_3C_2$ MXene in Example 1 above, PEGDA, EGDMA, Irgacure 1173, and calcium ion was drop-coated and applied on a chrome (Cr)-gold (Au) metal electrode patterned through photolithography and thermal evaporation in an amount of 10 μL each. Before the drop coating, 3-(trimethoxysilyl)propyl methacrylate was applied to improve the adhesion between the mixture and the electrode to form a self-assembled monolayer. Thereafter, the mixture applied by drop coating to the metal electrode was exposed to a UV lamp having a wavelength of 365 nm at room temperature for 10 minutes to cure the MXene-polymer composite according to an embodiment of the disclosure on the metal electrode through a photocuring reaction to manufacture a sensor.

The manufactured sensor was used as an electrochemical sensor or as a gas sensor after lyophilization for 24 hours.

[Comparative Example] Manufacture of a Sensor Using a MXene Thin Film

A sensor was manufactured by spin-coating a 10 nm thick $Ti_3C_2$ MXene thin film on the same metal electrode as in Example 2 using the MXene aqueous solution prepared in Preparation Example above.

Figure 2A:
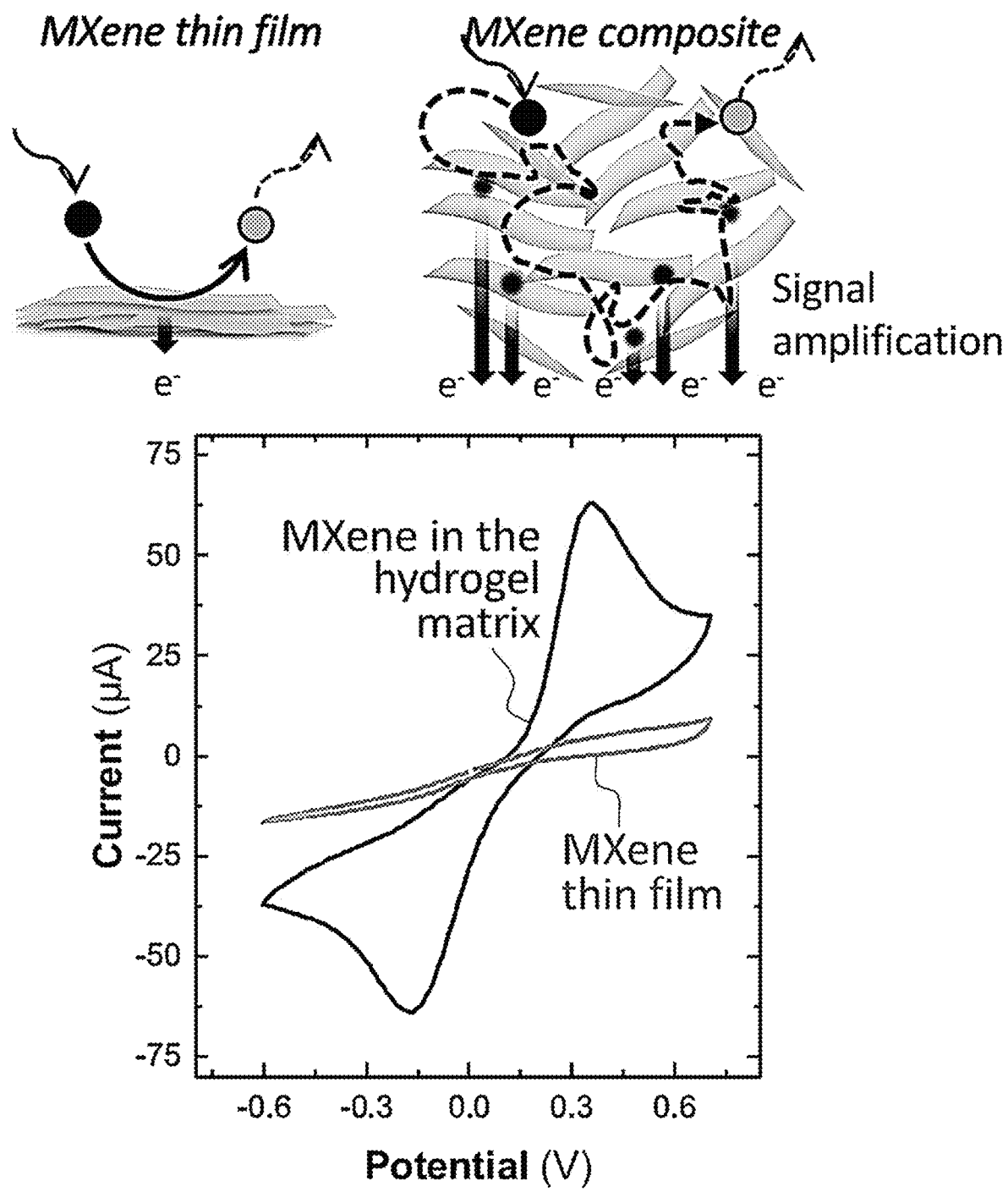
FIG. 2A is a graph showing the performance comparison result of electrochemical sensors made of a MXene thin film and an electrochemical sensor (MXene in the hydrogel matrix) according to an embodiment of the disclosure.

[Experimental Example 1] Determination on the Dopamine Detecting Activity of an Electrochemical Sensor Using the MXene-Polymer Composite First, the electrical measurement capabilities of the MXene-polymer composite (MXene in the hydrogel matrix) sensor manufactured in Example 2 and the MXene thin film sensor manufactured in Comparative Example were compared through cyclic voltammetry (CV) measurement. Particularly, the electrical measurement capability of the sensor was evaluated by exposing the sensor to an aqueous solution of 0.1 mM potassium ferricyanide (99%, Aldrich) without adding dopamine. The results are shown in FIG. 2A.

From the results of FIG. 2A, it can be seen that the area of CV in the graph increases significantly in the case of the MXene-polymer composite sensor, which contributes to the excellent performance of the composite electrochemical sensor shown in FIG. 2B described below.

Next, in order to determine the dopamine detecting activity of the electrochemical sensor using the MXene-polymer composite manufactured in Example 2, dopamine hydrochloride (98%, Aldrich) was dissolved in 0.1 mM potassium ferricyanide (99%, Aldrich) aqueous solution, and dopamine aqueous solutions of various concentrations (5 nM, 10 nM, 20 nM, 40 nM, 60 nM, 80 nM, 100 nM, 0.9 μM, 1.9 μM, 2.9 μM and 3.9 μM) were prepared. The electrochemical measurement was performed by exposing the prepared dopamine aqueous solution to the electrochemical sensor manufactured Example 2 and the sensor manufactured in Comparative Example, respectively. The sensor performance was measured with Metrohm (Switzerland)'s AUTOLAB PGSTAT302N model, and Nova 2.0 provided by the same company was used as the analysis software. The results are shown in FIG. 2B.

Figure 2B:
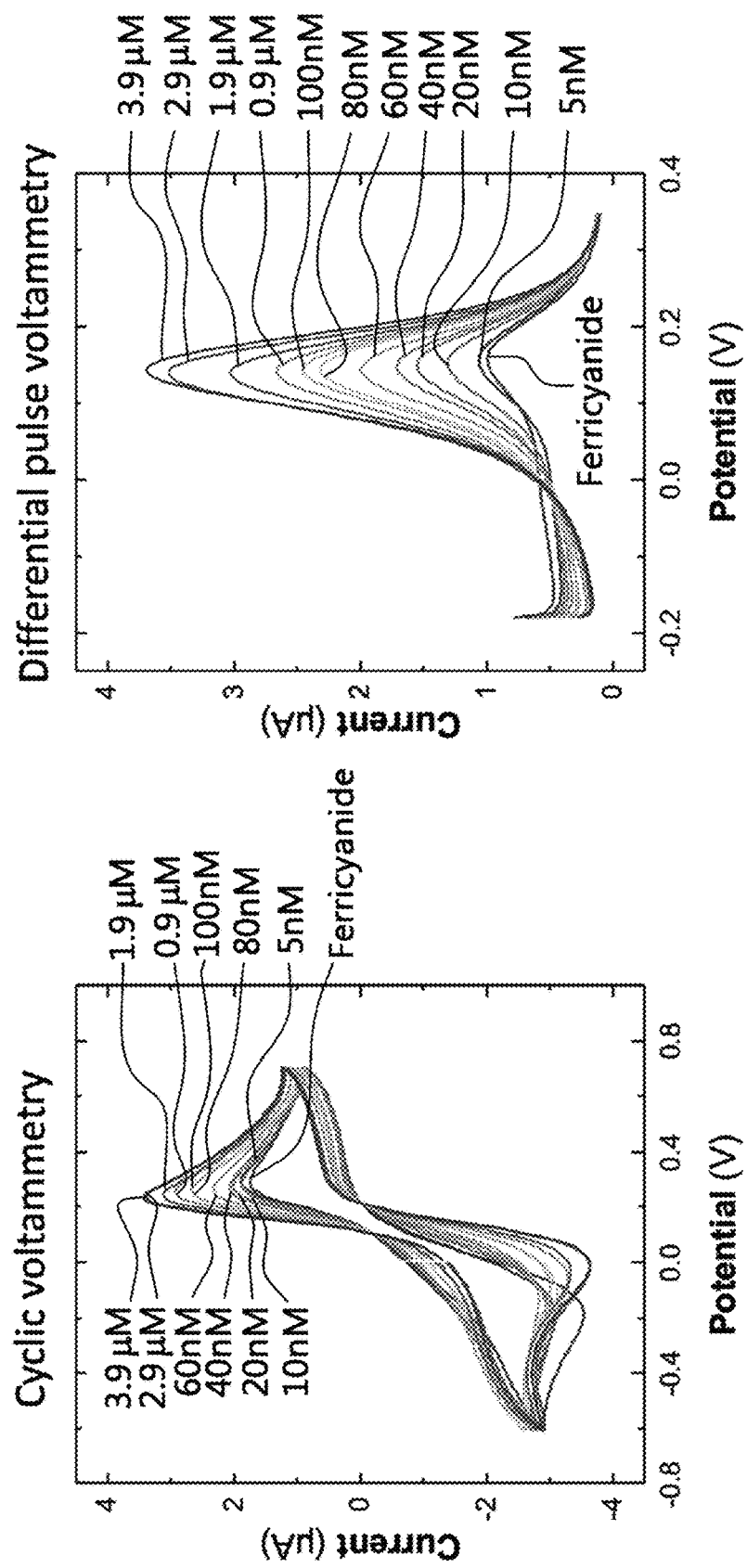
FIG. 2B is a graph showing the dopamine detection result of an electrochemical sensor according to an embodiment of the disclosure.

As shown in FIG. 2B, it was confirmed that the higher the dopamine concentration in the aqueous solution, the higher the area and peak height in the cyclic voltammetry (CV) and differential pulse voltammetry (DPV) graphs. From this, it was confirmed that the electrochemical sensor using the MXene-polymer composite according to an embodiment of the disclosure exhibited excellent selectivity and sensitivity to dopamine.

[Experimental Example 2] Determination of Ammonia Detecting Activity of a Gas Sensor Using the MXene-Polymer Composite The MXene thin film sensor manufactured in Comparative Example 1 and the MXene-polymer composite gas sensor manufactured in Example 2 were placed in an airtight sensor chamber, and ammonia gas diluted to 100 ppm by nitrogen gas was injected in the sensor chamber to conduct a sensor test. The sensor performance was evaluated by measuring the change in electrical resistance according to the injection of ammonia gas. The sensor performance (electrical resistance change) was measured with Keithley Instruments (USA)'s 2400 model, and a self-made resistance measurement program was used as the analysis software. The results are shown in FIG. 4.

Figure 4:
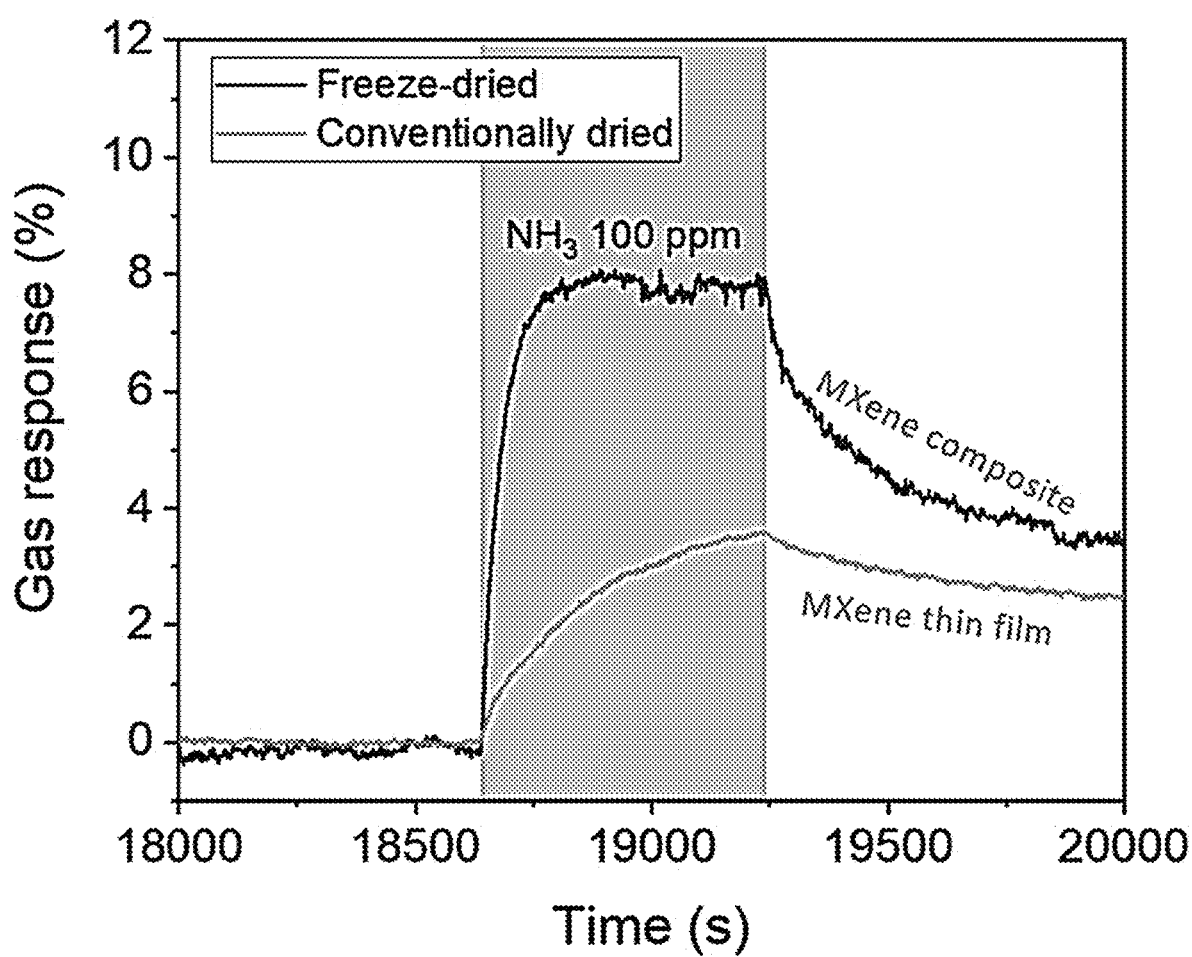
FIG. 4 is a graph showing the ammonia detection result of a gas sensor according to an embodiment of the disclosure.

From the results of FIG. 4, it was confirmed that the detecting activity for ammonia gas of the gas sensor using the MXene composite according to an embodiment of the disclosure was significantly superior to that of the MXene thin film sensor.

Figure 3:
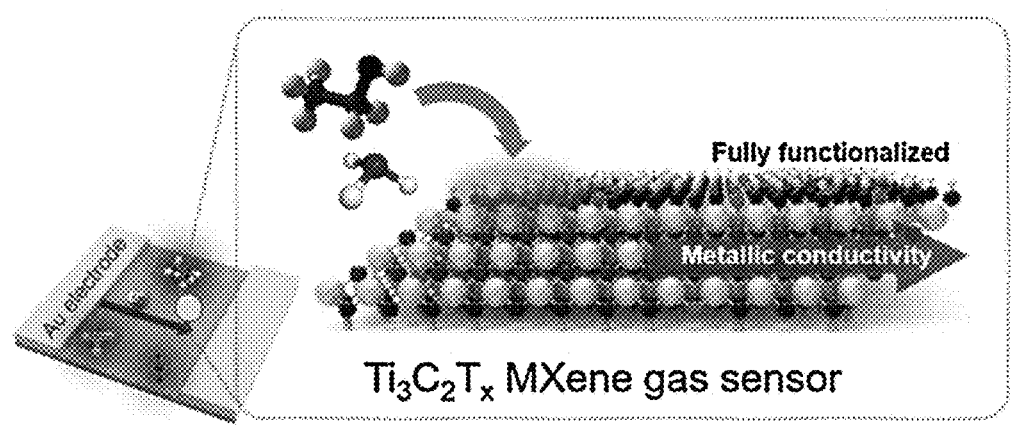
FIG. 3 schematically illustrates the structures of MXene and a MXene thin film used in a MXene-polymer composite and a MXene-polymer composite according to an embodiment of the disclosure.
Figure 3:
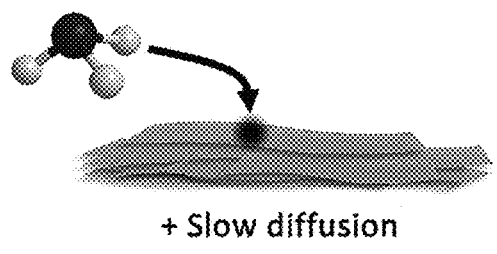
Figure 3:
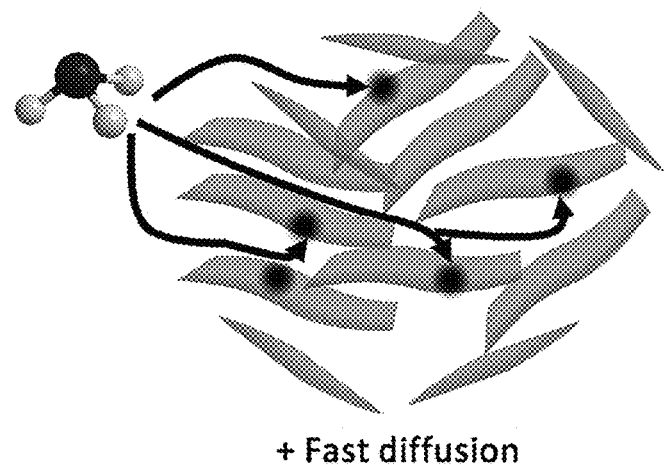

As shown in FIG. 3, it can be seen that this result is because, compared to the sensor using the two-dimensional MXene thin film, the gas sensor using the MXene composite according to an embodiment of the disclosure has a much larger surface area for sensing ammonia gas due to the porous structure of the hydrogel composite.

What is claimed is:

1. A MXene-polymer composite comprising MXene and a UV curable polymer, wherein the UV curable polymer is at least two selected from the group consisting of polyethylene glycol diacrylate (PEGDA), ethylene glycol dimethacrylate (EGDMA), and SU-8 epoxy-based resin.

2. The MXene-polymer composite of claim 1, wherein the composite is in a form of a hydrogel.

3. The MXene-polymer composite of claim 1, wherein the composite has a porous structure with a pore size of 1 to 10 μm.

4. The MXene-polymer composite of claim 1, wherein the MXene includes at least one layer with a two-dimensional array of crystal cells represented by an empirical formula of $M_{n+1}X_n$,
where each X is positioned in an octahedral array formed of a plurality of M elements, M is at least one metal selected from the group consisting of a Group IIIB metal, a Group IVB metal, a Group VB metal, and a Group VIB metal, each X represents C, N, or a combination thereof, and n is 1, 2, or 3.

5. The MXene-polymer composite of claim 4, wherein the MXene is $Ti_3C_2$ MXene.

6. The MXene-polymer composite of claim 1, wherein the MXene includes at least one layer with a two-dimensional array of crystal cells represented by an empirical formula of $M'_2M''_nX_{n+1}$,
where each X is positioned in an octahedral array formed of a plurality of M' and M" elements, M' and M" are different metals selected from the group consisting of a Group IIIB metal, a Group IVB metal, a Group VB metal, and a Group VIB metal, each X represents C, N, or a combination thereof, and n is 1 or 2.

7. The MXene-polymer composite of claim 1, wherein the MXene is comprised in an amount of 5 to 90% (v/v) based on a total volume of the composite.

8. The MXene-polymer composite of claim 1, wherein the UV curable polymer is comprised in an amount of 5 to 90% (v/v) based on a total volume of the composite.

9. The MXene-polymer composite of claim 1, further comprising a radical initiator and a cation.

10. The MXene-polymer composite of claim 9, wherein the radical initiator is a free radical photoinitiator.

11. The MXene-polymer composite of claim 10, wherein the free radical photoinitiator is one or more selected from a benzophenone-based photoinitiator and a thiaxantone-based photoinitiator.

12. The MXene-polymer composite of claim 9, wherein the radical initiator and the cation are comprised in an amount of 5 to 20% (v/v) based on a total volume of the composite.

13. A sensor comprising the MXene-polymer composite according to claim 1, and an electrode coated with the composite.

14. The sensor of claim 13, wherein the electrode is formed in a form of a thin film using any one of aluminum (Al), nickel (Ni), platinum (Pt), titanium (Ti), chromium (Cr), and gold (Au).

15. The sensor of claim 13, wherein a surface of the electrode is pre-treated.

16. The sensor of claim 15, wherein the pre-treatment is selected from a self-assembled monolayer method, a polymer coating method, and a plasma ion treatment method.

17. The sensor of claim 13, wherein the sensor is an electrochemical sensor.

18. The sensor of claim 13, wherein the sensor is a gas sensor.

* * * * *